US011604704B2

(12) United States Patent
Jiang et al.

(10) Patent No.: US 11,604,704 B2
(45) Date of Patent: Mar. 14, 2023

(54) METHOD, DEVICE AND COMPUTER PROGRAM PRODUCT FOR DATA BACKUP

(71) Applicant: EMC IP Holding Company LLC, Hopkinton, MA (US)

(72) Inventors: Yi Jiang, Chengdu (CN); Wei Chen, Chengdu (CN); Qin Liu, Chengdu (CN); Wenhao Dai, Chengdu (CN); Jianxu Xu, Chengdu (IN); Jiang Fu, Chengdu (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 209 days.

(21) Appl. No.: 16/882,585

(22) Filed: May 25, 2020

(65) Prior Publication Data

US 2021/0248043 A1 Aug. 12, 2021

(30) Foreign Application Priority Data

Feb. 6, 2020 (CN) ........................ 202010081948.X

(51) Int. Cl.
*G06F 11/14* (2006.01)
*G06K 9/62* (2022.01)
*G06F 9/48* (2006.01)

(52) U.S. Cl.
CPC ........ *G06F 11/1464* (2013.01); *G06F 9/4843* (2013.01); *G06K 9/6282* (2013.01); *G06F 2209/5018* (2013.01)

(58) Field of Classification Search
CPC ............. G06F 11/1464; G06F 11/1466; G06F 2209/5018; G06F 9/4843; G06F 9/5027; G06F 11/1448; G06F 11/1458; G06K 9/6282; G06N 20/00
USPC .................................................. 711/162, 161
See application file for complete search history.

(56) References Cited

U.S. PATENT DOCUMENTS

| | | | | |
|---|---|---|---|---|
| 7,574,461 | B1 * | 8/2009 | Armorer | G06F 11/1458 |
| 8,775,549 | B1 * | 7/2014 | Taylor | H04L 67/1097 709/217 |
| 10,613,899 | B1 * | 4/2020 | Saha | G06N 20/00 |
| 2004/0267838 | A1 * | 12/2004 | Curran | G06F 11/1451 |
| 2017/0199887 | A1 * | 7/2017 | Fullbright | G06F 16/113 |

(Continued)

OTHER PUBLICATIONS

NPL Gavanker et al. "Eager Decision Tree", 2017 2nd International Conference for Convergence in Technology (12 CT) (Year: 2017).*

(Continued)

*Primary Examiner* — Daniel D Tsui
*Assistant Examiner* — Zubair Ahmed
(74) *Attorney, Agent, or Firm* — Chamberlain, Hrdlicka, White, Williams & Aughtry

(57) ABSTRACT

Embodiments of the present disclosure relate to a method for data backup. The method includes obtaining an attribute value associated with a backup task to be run, the backup task being used for backing up data on a client terminal to a server through a network, the attribute value including a value of at least one of an attribute of the client terminal, an attribute of the server, and an attribute of the network; determining, based on the attribute value, the number of threads to be used to perform the backup task on the client terminal; and causing the client terminal to perform the backup task using the number of threads to back up the data.

20 Claims, 6 Drawing Sheets

(56) References Cited

U.S. PATENT DOCUMENTS

2018/0095816 A1* 4/2018 Fang .................. G06F 11/1451
2020/0320035 A1* 10/2020 Javeed .................. G06N 3/006

OTHER PUBLICATIONS

"Operational Best Practices Guide", Dell EMC Avamar, Version 18.2, Dec. 2018 (108 pages).

* cited by examiner

300

310 320 330

| Source | Attribute | Range (unit) |
|---|---|---|
| Client terminal | Number of processor cores of client terminal | [0, 100] |
| | Processing resource utilization rate of client terminal | [0, 100%] |
| | Storage resource utilization rate of client terminal | [0, 100%] |
| | Input/output resource utilization rate of client terminal | [0, 100%] |
| | Number of files to be backed up by backup task on client terminal | [0, +∞) |
| | Size of data to be backed up by backup task on client terminal | [0, +∞) (GB) |
| Server | Number of backup and recovery tasks being run on server | [0, 100] |
| | Processing resource utilization rate of server | [0, 100%] |
| | Storage resource utilization rate of server | [0, 100%] |
| | Input/output resource utilization rate of server | [0, 100%] |
| 2 | Available network bandwidth | [0, +∞) (Mbps) |
| | Network round-trip time | [0, +∞) (ms) |

FIG. 3

| Number of processor cores of client terminal | Number of threads | Number of backup and recovery tasks | Processing resource utilization rate of client terminal | Storage resource utilization rate of client terminal | Data size | Backup efficiency (GB/hour/thread) |
|---|---|---|---|---|---|---|
| 8 | 8 | 1 | 80% | 40% | 300 GB | 100 |
| 8 | 4 | 1 | 90% | 40% | 200 GB | 80 |
| 16 | 16 | 3 | 60% | 70% | 80 GB | 140 |
| 4 | 8 | 5 | 75% | 30% | 120 GB | 60 |
| 4 | 16 | 1 | 50% | 50% | 70 GB | 100 |
| 4 | 4 | 2 | 70% | 80% | 500 GB | 80 |

METHOD, DEVICE AND COMPUTER PROGRAM PRODUCT FOR DATA BACKUP

CROSS-REFERENCE TO RELATED APPLICATIONS

This application claims priority to Chinese Patent Application No. 202010081948.X filed on Feb. 6, 2020. Chinese Patent Application No. 202010081948.X is hereby incorporated by reference in its entirety.

FIELD OF THE INVENTION

Embodiments of the present disclosure generally relate to computer technologies, and more particularly, to a method, a device, and a computer program product for data backup.

BACKGROUND

With the development of information technologies, the importance of data is rapidly increasingly high. Data backup can prevent data loss due to operation errors or system failures. More and more entities, such as individuals, companies, schools, government agencies, and the like, use backup solutions to protect their data. As the size of data sets increases, more and more attention is paid to backup efficiency. Therefore, a proper backup solution is needed to improve backup efficiency.

SUMMARY OF THE INVENTION

Embodiments of the present disclosure provide a method, a device, and a computer program product for data backup.

In a first aspect of the present disclosure, a method for data backup is provided. The method includes: obtaining an attribute value associated with a backup task to be run, the backup task being used for backing up data on a client terminal to a server through a network, the attribute value including a value of at least one of an attribute of the client terminal, an attribute of the server, and an attribute of the network; determining, based on the attribute value, the number of threads to be used to perform the backup task on the client terminal; and causing the client terminal to perform the backup task using the number of threads to back up the data.

In a second aspect of the present disclosure, an electronic device is provided. The device includes at least one processing unit and at least one memory. At least one memory is coupled to the at least one processing unit and stores instructions for execution by the at least one processing unit. The instructions, when executed by the at least one processing unit, cause the device to perform actions. The actions include: obtaining an attribute value associated with a backup task to be run, the backup task being used for backing up data on a client terminal to a server through a network, the attribute value including a value of at least one of an attribute of the client terminal, an attribute of the server, and an attribute of the network; determining, based on the attribute value, the number of threads to be used to perform the backup task on the client terminal; and causing the client terminal to perform the backup task using the number of threads to back up the data.

In a third aspect of the present disclosure, a computer program product is provided. The computer program product is tangibly stored on a non-transitory computer-readable medium and includes machine-executable instructions that, when executed, cause a machine to implement any step of the method described according to the first aspect of the present disclosure.

This summary is provided to introduce the selection of concepts in a simplified form, which will be further described in the detailed description below. This summary is neither intended to identify key features or essential features of the present disclosure, nor intended to limit the scope of the present disclosure.

DESCRIPTION OF THE DRAWINGS

The above and other objectives, features and advantages of the present disclosure will become more apparent by describing example embodiments of the present disclosure in detail with reference to the accompanying drawings, and in the example embodiments of the present disclosure, the same reference numerals generally represent the same components.

FIG. 3 illustrates a schematic diagram of an example of attributes according to some embodiments of the present disclosure;

In each figure, the same or corresponding reference numerals represent the same or corresponding parts.

DETAILED DESCRIPTION

Figure 1:
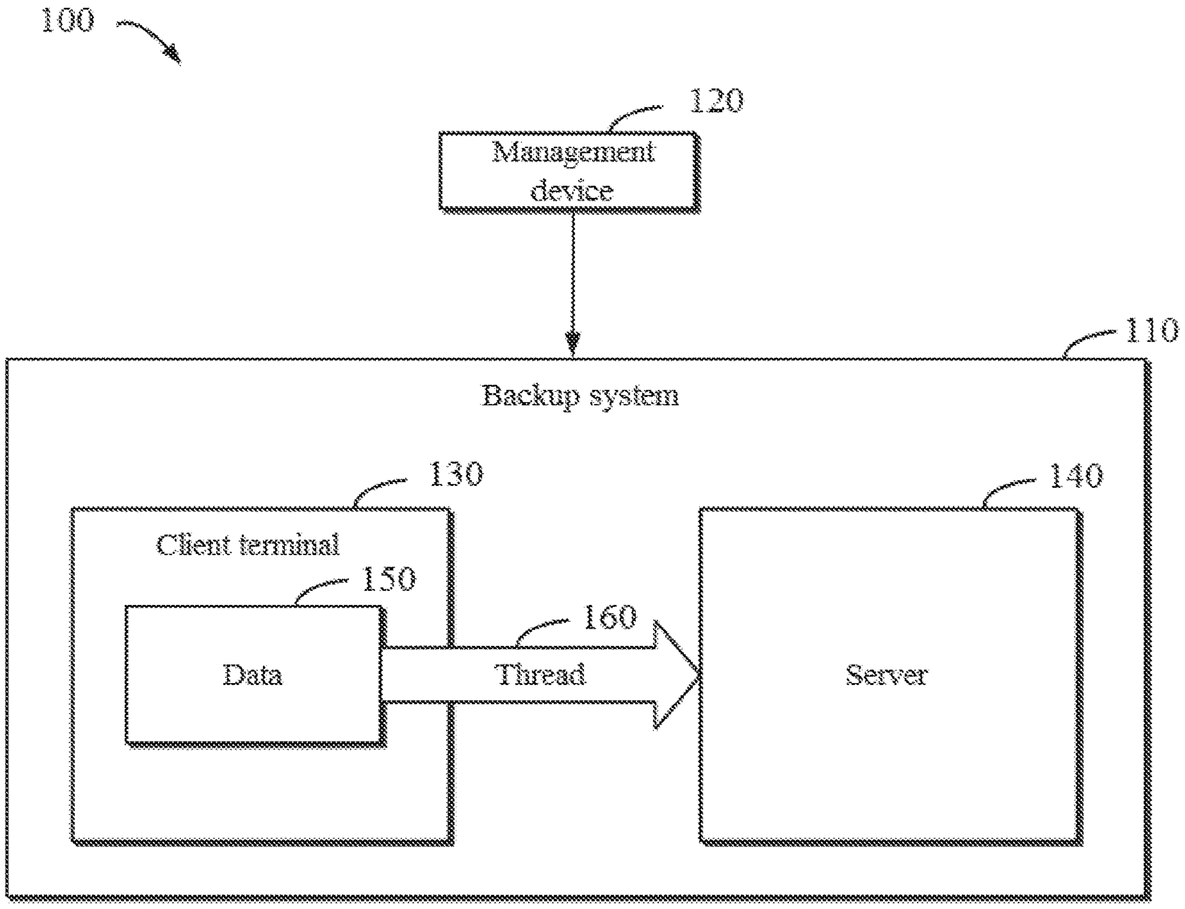
FIG. 1 illustrates a schematic diagram of an example of a backup environment according to some embodiments of the present disclosure.

Preferred embodiments of the present disclosure will be described in more detail below with reference to the accompanying drawings. Although preferred embodiments of the present disclosure are illustrated in the accompanying drawings, it should be understood that the present disclosure may be implemented in various forms and should not be limited by the embodiments illustrated herein. Rather, these embodiments are provided to make the present disclosure more thorough and complete, and will fully convey the scope of the present disclosure to those skilled in the art.

The term "include/comprise" and its variants as used herein mean open including, i.e., "including/comprising but not limited to." Unless specifically stated, the term "or" means "and/or." The term "based on" means "based at least in part on." The terms "one example embodiment" and "one embodiment" mean "at least one example embodiment." The term "another embodiment" means "at least one additional embodiment." The terms "first," "second" etc. may refer to different or identical objects. Other clear and implicit definitions may be included below.

Traditionally, the solution used by most backup systems to improve backup efficiency is to increase the number of threads for performing a backup task so as to conduct parallel backup. In this way, the backup task will try to make full use of resources of a client terminal to improve the backup efficiency. However, the relationship between the number of threads and backup efficiency is not linear. In other words, it is not necessarily indicated that the backup efficiency will be higher as more threads are used. In addition to the number of threads, the backup efficiency also depends on several other factors in a backup environment. Therefore, it is difficult for users to determine the suitable number of threads to conduct parallel backup. This results in a large number of requests from users to adjust their backup systems and help them determine the suitable number of threads. Especially when there are tens of thousands of users in a backup environment, the workload of determining the suitable number of threads for each user will be extremely large. Moreover, if the determined number of threads is incorrect, the backup task will consume a lot of resources, which will affect other important services of the client terminal.

According to an example embodiment of the present disclosure, an improved scheme for data backup is proposed. In this scheme, an attribute value associated with a backup task to be run may be obtained. The backup task may be used to back up data on a client terminal to a server through a network. The attribute value may include a value of at least one of an attribute of the client terminal, an attribute of the server, and an attribute of the network. Thus, based on the attribute value, the number of threads to be used for performing a backup task on the client terminal may be determined, and the client terminal is caused to perform the backup task using the number of threads to back up the data.

As such, the number of threads for performing the backup task may be easily determined based on the attribute value associated with the backup task. In this way, the suitable number of threads may be recommended automatically and intelligently according to a current status of a backup system so as to conduct parallel backup. Thus, the administrative cost of managing the backup system may be reduced, the number of threads may be adjusted in real time, and the backup efficiency and user experience may be improved.

Hereinafter, specific examples of this scheme will be described in more detail in conjunction with FIGS. 1 to 6. FIG. 1 illustrates a schematic diagram of an example of backup environment 100 according to some embodiments of the present disclosure. Backup environment 100 includes backup system 110 and management device 120. Backup system 110 may implement data backup to ensure data security. Specifically, backup system 110 includes client terminal 130 and server 140. Client terminal 130 and server 140 may be connected through various types of networks such as a wired or wireless network. Client terminal 130 may run a backup task using a certain number of threads 160. The backup task is used to back up data 150 on client terminal 130 to server 140 through a network. It should be understood that, for clarity, only one client terminal 130, one server 140 and one thread 160 are shown in FIG. 1. However, the number of client terminals, servers and threads is not limited and may be any suitable value.

Management device 120 is configured to manage backup system 110. It should be understood that although management device 120 is shown as being external to backup system 110, management device 120 may also be a part of backup system 110. According to an embodiment of the present disclosure, management device 120 may determine the number of threads 160 to be used for performing a backup task on the client terminal 130, so as to manage the backup task. Specifically, management device 120 may obtain a current status of backup system 110 and automatically and intelligently predict the suitable number of threads 160 for performing a backup task according to the current status of backup system 110. Management device 120 may provide the predicted number of threads 160 to backup system 110 so that client terminal 130 may perform the backup task using the number of threads 160 to back up data 150.

Management device 120, client terminal 130 and server 140 may include, but are not limited to, any device with computing and storage capabilities, such as cloud computing devices, mainframe computers, personal computers, desktop computers, laptop computers, tablet computers, personal digital assistants, etc.

Figure 2:
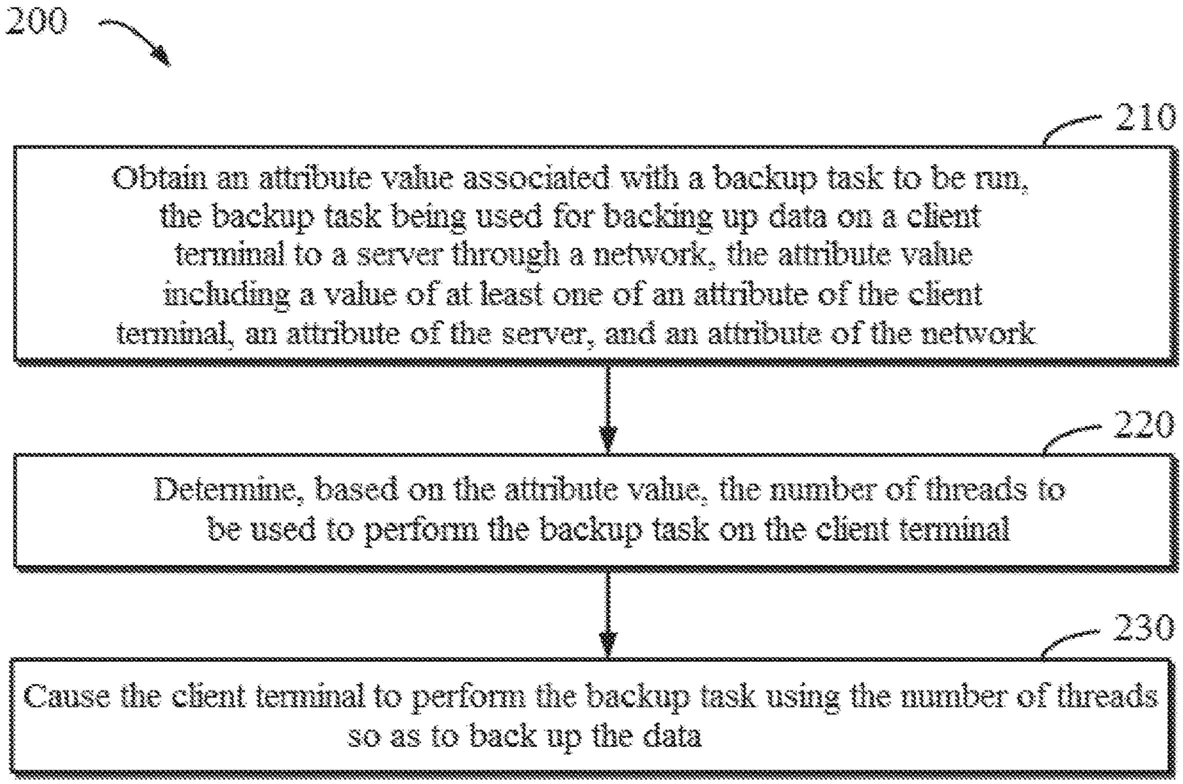
FIG. 2 illustrates a flowchart of a method for data backup according to some embodiments of the present disclosure.

Hereinafter, operations performed by management device 120 will be described in more detail in conjunction with FIGS. 2 to 5. FIG. 2 illustrates a flowchart of method 200 for data backup according to some embodiments of the present disclosure. Method 200 may be implemented, for example, by management device 120 as shown in FIG. 1. For ease of discussion, method 200 will be described below with reference to FIG. 1. It should be understood that method 200 may further include additional steps not shown and/or omit the steps shown, and the scope of the present disclosure is not limited in this regard.

At 210, management device 120 obtains an attribute value associated with a backup task to be run. The backup task is used to back up data 150 on client terminal 130 to server 140 through a network. The attribute value includes a value of at least one of an attribute of client terminal 130, an attribute of server 140, and an attribute of the network.

There are various factors that affect backup efficiency in backup environment 100. Since the backup task involves backing up data 150 on client terminal 130 to server 140 through a network, these factors may include the attribute of client terminal 130, the attribute of server 140, and the attribute of the network. FIG. 3 illustrates schematic diagram 300 of an example of attributes according to some embodiments of the present disclosure.

As shown in FIG. 3, source 310 indicates an entity to which an attribute is directed, such as a client terminal, a server and a network. Attribute 320 and range 330 indicate the type and value range of a specific attribute. In the example shown in FIG. 3, the attribute of client terminal 130 includes: the number of processor cores of client terminal 130, a processing resource utilization rate of client terminal 130, a storage resource utilization rate of client terminal 130, an input/output resource utilization rate of client terminal 130, the number of files to be backed up by the backup task on client terminal 130, and the size of data 150 to be backed up by the backup task on client terminal 130.

The attribute of server 140 includes: the number of backup and recovery tasks being run on server 140, a processing resource utilization rate of server 140, a storage resource utilization rate of server 140, and an input/output resource utilization rate of server 140. In addition, the attribute of the network includes: an available network bandwidth and network round-trip time.

Referring back to FIG. 2, at 220, management device 120 determines, based on the attribute value, the number of threads 160 to be used for performing a backup task on client terminal 130. Thus, management device 120 may automatically and intelligently predict the number of threads 160 according to multiple factors that affect backup efficiency in backup system 110.

Management device 120 may determine the number of threads 160 in various ways. In some embodiments, in order to determine the number of threads 160, management device 120 may use a thread prediction model that characterizes an association between the attributes of client terminal 130, server 140 and the network and the number of threads 160, for example, various types of deep learning models, such as a very fast decision tree (VFDT) model.

Figure 4:
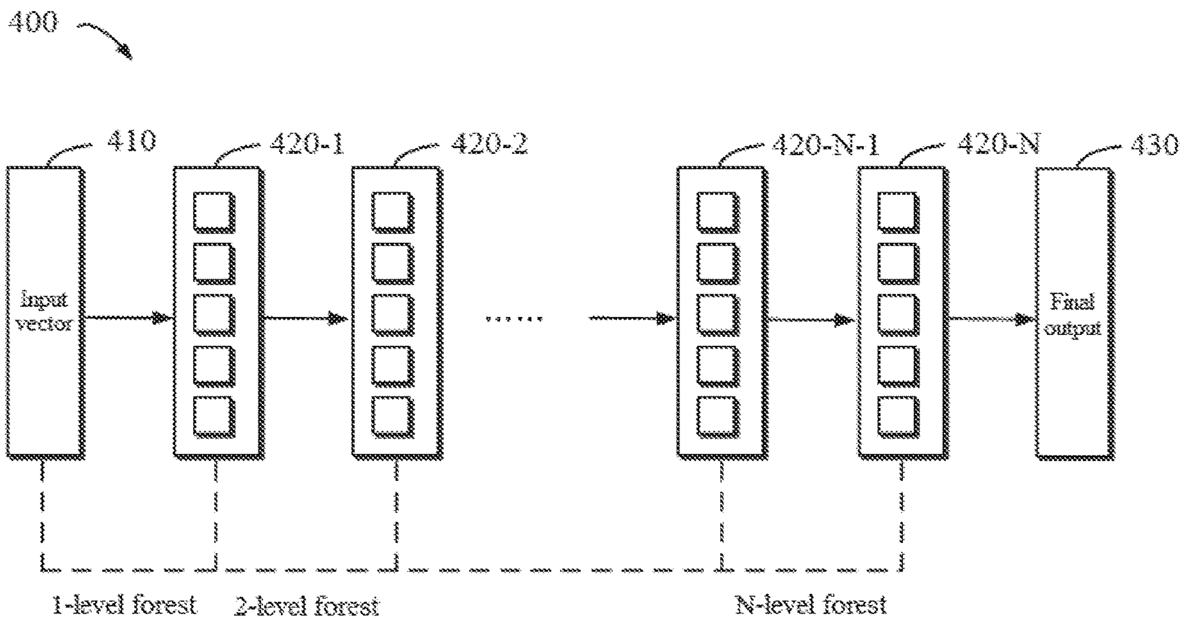
FIG. 4 illustrates a schematic diagram of an example of a thread prediction model according to some embodiments of the present disclosure.

In some embodiments, management device 120 may obtain a thread prediction model and apply the attribute value to the thread prediction model to obtain the number of threads 160. To better understand the thread prediction model, the thread prediction model and the training of the thread prediction model will be described below with reference to FIGS. 4 and 5. FIG. 4 illustrates a schematic diagram of an example of thread prediction model 400 according to some embodiments of the present disclosure. As shown in FIG. 4, thread prediction model 400 includes input vector 410, final output 430, and a multi-level forest (that is, 1-level forest to N-level forest, where N is a natural number greater than 0) as well as multiple intermediate vectors (that is, intermediate vector 420-1 to intermediate vector 420-N) output by the multi-level forest. In some embodiments, thread prediction model 400 is cascaded. Specifically, intermediate vector 420-1 output by the 1-level forest is connected to an input vector as an input to the 2-level forest, and intermediate vector 420-2 output by the 2-level forest is connected to an input vector as an input to the 3-level forest, and so on.

In some embodiments, when the thread prediction model 400 is a VFDT model, since the VFDT model is a decision tree model based on a Hoeffding tree, the multi-level forest is a multi-level Hoeffding forest. The Hoeffding tree is a streaming decision tree. The principle is that a Hoeffding boundary gives a certain degree of confidence to the best attributes of a partition tree, so a model may be constructed based on a certain number of instances that have been observed. The Hoeffding boundary is used to determine how many instances are needed to achieve a certain degree of confidence. The Hoeffding boundary has the ability to give the same result, regardless of the probability distribution of the generated observations. However, the number of observations required to reach a specific value varies for different probability distributions.

Such a linear prediction model may be trained by any device having a computing capability, such as a computing device, a server, and an edge computing node that are external to management device 120. In some cases, the linear prediction model may also be trained by management device 120. In the following, the training of the linear prediction model is described as being performed by management device 120 only for convenience of discussion.

Specifically, management device 120 may obtain execution records associated with a historical backup task. Each execution record may include at least a historical value of the attribute of client terminal 130, a historical value of the attribute of server 140, and a historical value of the attribute of the network. Since the attribute of client terminal 130, the attribute of server 140 and the attribute of the network have been described in detail above, descriptions thereof are omitted here. In addition, each execution record may also include backup efficiency of the historical backup task and the number of threads 160 for performing the historical backup task. Management device 120 may determine a thread prediction model based on these execution records, so that the number of threads 160 output by the thread prediction model can achieve backup efficiency exceeding an efficiency threshold.

In some embodiments, the execution records may be represented by vectors $X_m=[a_m, b_m, c_m, d_m, e_m, f_m, \ldots, y_m]$, where $a_m$, $b_m$, $c_m$, $d_m$, $e_m$ and $f_m$ respectively represent the historical values of various attributes except the historical value of backup efficiency, $y_m$ represents the historical value of the backup efficiency, and m represents division of the execution records into m groups. Thus, the following historical value matrix (1) may be obtained:

$$\begin{pmatrix} x_1 \\ x_2 \\ \vdots \\ x_m \end{pmatrix} = \begin{bmatrix} a_1 & b_1 & c_1 & d_1 & e_1 & f_1 & \ldots & y_1 \\ a_2 & b_2 & c_2 & d_2 & e_2 & f_2 & \ldots & y_2 \\ \vdots & \vdots & \vdots & \vdots & \vdots & \vdots & & \vdots \\ a_m & b_m & c_m & d_m & e_m & f_m & \ldots & y_m \end{bmatrix}. \quad (1)$$

Figure 5:
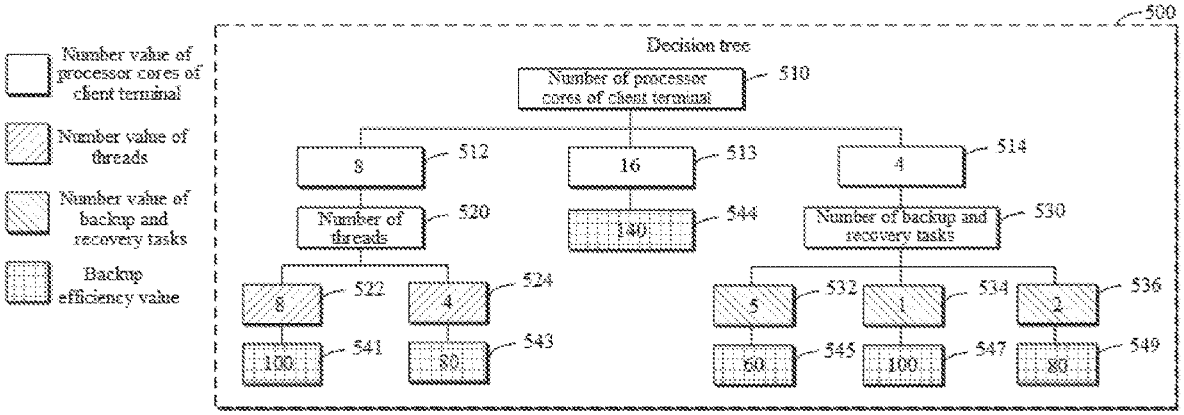
FIG. 5 illustrates a schematic diagram of an example of a part of a decision tree according to some embodiments of the present disclosure.

These execution records may be used to dynamically create a decision tree to represent prior knowledge. Hereinafter, the decision tree will be described with reference to FIG. 5. FIG. 5 illustrates a schematic diagram of an example of a part of decision tree 500 according to some embodiments of the present disclosure. Decision tree 500 is created based on the execution records shown by list 550. In the case where the thread prediction model is a VFDT model, decision tree 500 may be a Hoeffding decision tree. In the example of FIG. 5, root node 510 represents, for example, an attribute "number of processor cores of client terminal," and is connected by edges to leaf node 512, leaf node 513 and leaf node 514 that represent attribute values (being 8, 16 and 4, respectively) of "number of processor cores of client terminal."

Leaf node 512 is connected by an edge to leaf node 520 that represents an attribute "number of threads for performing historical backup task", leaf node 513 is connected by an edge to leaf node 544 that represents an attribute value (being 140) of "backup efficiency," and leaf node 514 is connected by an edge to leaf node 530 that represents an attribute "number of backup and recovery tasks being run on server."

Leaf node 520 is connected by edges to leaf node 522 and leaf node 524 that represent attribute values (being 8 and 4, respectively) of "number of threads 160 for performing historical backup task." Leaf node 530 is connected by edges to leaf node 532, leaf node 534 and leaf node 536 that represent attribute values (being 5, 1 and 2, respectively) of "number of backup and recovery tasks being run on server."

Leaf node 522 and leaf node 524 are respectively connected by edges to leaf node 541 and leaf node 543 that represent attribute values (being 100 and 80, respectively) of "backup efficiency." Leaf node 532, leaf node 534 and leaf node 536 are respectively connected by edges to leaf node 545, leaf node 547 and leaf node 549 that represent attribute values (being 60, 100 and 80, respectively) of "backup efficiency."

After self-learning, each group of execution records may create a decision tree, that is, a total of m decision trees is created. The m decision trees form the 1-level forest as shown in FIG. 4. As described above, an output of the 1-level forest is an input to a 2-level forest for training the 2-level forest, and an output of the 2-level forest is an input to a 3-level forest for training the 3-level forest, and so on. Finally, assuming that an Nth-level forest has K decision trees $T_1, T_2, T_3, \ldots, T_K$ (where K is a natural number greater than 0), the trained thread prediction model may obtain K outputs of the most suitable number of threads 160 with backup efficiency exceeding an efficiency threshold (for example, the backup efficiency is the highest). In some embodiments, the number of threads 160, in the K outputs, for which the number of predictions exceeds a predetermined threshold may be selected as final output 430. For example, if most of the K outputs predict that the number of threads 160 is 8, the number 8 of threads 160 will be selected as final output 430.

After the training is completed, the thread prediction model may be deployed into management device 120, and management device 120 is configured to determine the number of threads 160 to be used for performing a backup task. Thus, referring back to FIG. 2, at 230, management device 120 causes client terminal 130 to perform a backup task using the number of threads 160, so as to back up data 150. For example, management device 120 may send the number of threads 160 to client terminal 130. After receiving the number of threads 160, client terminal 130 will launch the number of threads 160 to conduct parallel backup.

As such, the number of threads 160 for performing a backup task may be easily determined based on the attribute value associated with the backup task. In this way, the suitable number of threads 160 may be recommended automatically and intelligently according to a current status of a backup system so as to conduct parallel backup. Thus, the labor cost of managing the backup system can be reduced, the number of threads 160 can be adjusted in real time, and the backup efficiency and user experience can be improved.

Further, in some embodiments, an attribute value associated with a newly executed backup task, the number of threads 160, and the backup efficiency may also be collected for incrementally training the thread prediction model to further improve the current thread prediction model.

Figure 6:
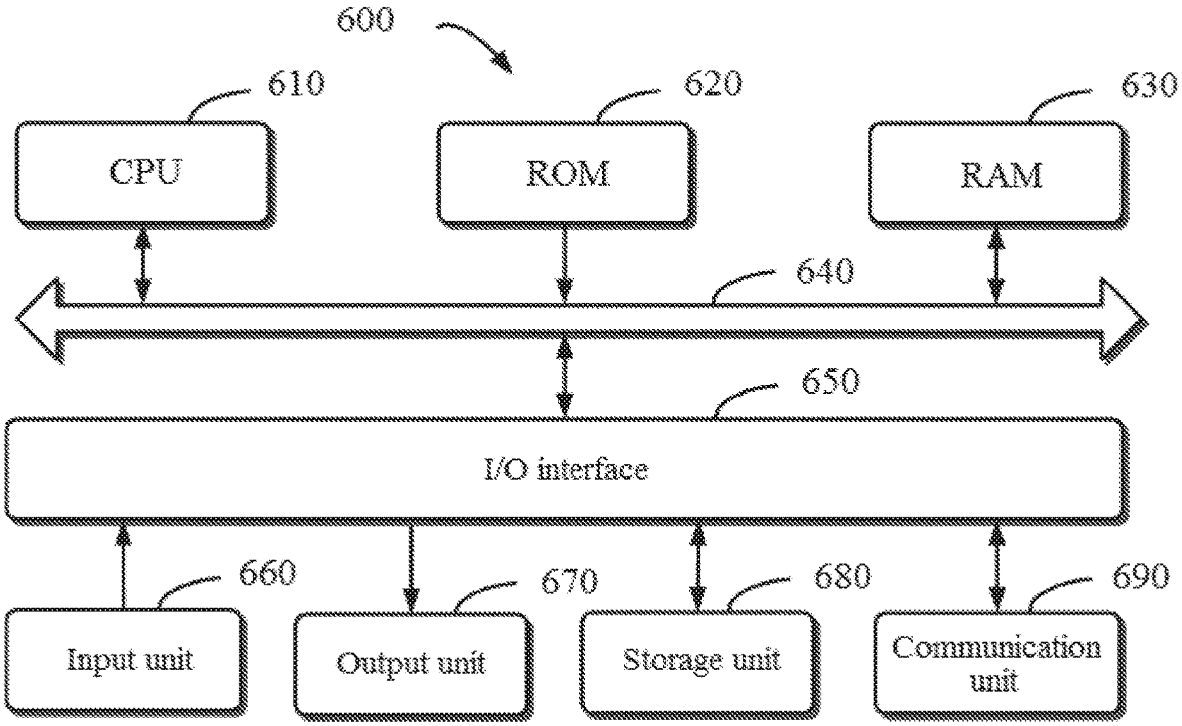
FIG. 6 illustrates a schematic block diagram of an example device that may be used to implement embodiments of the present disclosure.

FIG. 6 illustrates a schematic block diagram of example device 600 that may be used to implement embodiments of the present disclosure. For example, management device 120 as shown in FIG. 1 may be implemented by device 600. As shown in the figure, device 600 includes central processing unit (CPU) 610 that may perform various appropriate actions and processes according to computer program instructions stored in read only memory (ROM) 620 or computer program instructions loaded from storage unit 680 to random access memory (RAM) 630. In RAM 630, various programs and data required for the operation of device 600 may also be stored. CPU 610, ROM 620 and RAM 630 are connected to each other through bus 640. Input/output (I/O) interface 650 is also connected to bus 640.

Multiple components in device 600 are connected to I/O interface 650, including: input unit 660, such as a keyboard or a mouse; output unit 670, such as various types of displays or speakers; storage unit 680, such as a magnetic disk or an optical disk; and communication unit 690, such as a network card, a modem, or a wireless communication transceiver. Communication unit 690 allows device 600 to exchange information/data with other devices over a computer network such as the Internet and/or various telecommunication networks.

The various processes and processing described above, such as method 200, may be performed by processing unit 610. For example, in some embodiments, method 200 may be implemented as a computer software program that is tangibly included in a machine-readable medium, such as storage unit 680. In some embodiments, some or all of the computer program may be loaded and/or installed onto device 600 via ROM 620 and/or communication unit 690. One or more actions of method 200 described above may be performed when the computer program is loaded into RAM 630 and executed by CPU 610.

The present disclosure may be a method, an apparatus, a system, and/or a computer program product. The computer program product may include a computer-readable storage medium having computer-readable program instructions for performing various aspects of the present disclosure loaded thereon.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, an RAM, an ROM, an erasable programmable read only memory (EPROM or flash memory), a static random access memory (SRAM), a portable compact disk read only memory (CD-ROM), a digital versatile disk (DVD), a memory stick, a floppy disk, a mechanical coding device such as a punch card or a protruding structure within a groove having instructions stored thereon, and any suitable combination of the foregoing. The computer-readable storage medium as used herein is not to be interpreted as transient signals per se, such as radio waves or other freely propagated electromagnetic waves, electromagnetic waves propagated through waveguides or other transmission media (e.g., light pulses through fiber optic cables), or electrical signals transmitted through electrical wires.

The computer-readable program instructions described herein may be downloaded from the computer-readable storage medium to various computing/processing devices or downloaded to an external computer or an external storage device over a network, such as the Internet, a local area network (LAN), a wide area network (WAN), and/or a wireless network. The network may include copper transmission cables, fiber optic transmission, wireless transmission, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, status setting data, or source codes or object codes written in any combination of one or more programming languages, including object-oriented programming languages such as Smalltalk, C++, etc., as well as conventional procedural programming languages such as a "C" language or similar programming languages. The computer readable program instructions can be completely executed on a user's computer, partially executed on a user's computer, executed as a separate software package, partially executed on a user's computer and partially executed on a remote computer, or completely executed on a remote computer or a server. In the case where a remote computer is involved, the remote computer may be connected to a user computer through any type of networks, including an LAN or a WAN, or may be connected to an external computer (e.g., connected through the Internet by using an Internet service provider). In some embodiments, an electronic circuit, such as a programmable logic circuit, a field programmable gate array (FPGA), or a programmable logic array (PLA), may be customized by utilizing status information of the computer-readable program instructions.

The electronic circuit may execute the computer-readable program instructions to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block in the flowcharts and/or the block diagrams and combinations of the blocks in the flowcharts and/or the block diagrams may be implemented by the computer-readable program instructions.

The computer-readable program instructions may be provided to a processing unit of a general purpose computer, a special purpose computer or other programmable data processing apparatuses, thereby producing a machine such that when these instructions are executed by the processing unit of the computer or other programmable data processing apparatuses, an apparatus for implementing functions/actions specified in one or more blocks in the flowcharts and/or the block diagrams is generated. The computer-readable program instructions may also be stored in the computer-readable storage medium. The instructions enable the computer, the programmable data processing apparatuses and/or other devices to operate in a specific manner, so that the computer-readable medium storing the instructions includes an article of manufacture that includes instructions for implementing various aspects of functions/actions specified in one or more blocks in the flowcharts and/or the block diagrams.

The computer-readable program instructions may also be loaded onto a computer, other programmable data processing apparatuses or other devices such that a series of operational steps are performed on the computer, other programmable data processing apparatuses or other devices to produce a computer-implemented process. Thus, the instructions executed on the computer, other programmable data processing apparatuses or other devices implement the functions/actions specified in one or more blocks in the flowcharts and/or the block diagrams.

The flowcharts and block diagrams in the accompanying drawings illustrate the architecture, functions, and operations of possible implementations of systems, methods, and computer program products according to multiple embodiments of this disclosure. In this regard, each block in the flowcharts or block diagrams can represent a module, a program segment, or a portion of an instruction that includes one or more executable instructions for implementing specified logical functions. In some alternative implementations, functions labeled in the blocks may occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts, and a combination of blocks in the block diagrams and/or flowcharts can be implemented using a dedicated hardware-based system for executing specified functions or actions, or can be implemented using a combination of dedicated hardware and computer instructions.

Various embodiments of this disclosure have been described above, and the foregoing description is illustrative rather than exhaustive, and is not limited to the disclosed embodiments. Multiple modifications and variations will be apparent to those skilled in the art without departing from the scope and spirit of the illustrated various embodiments. The selection of terms as used herein is intended to best explain the principles and practical applications of the various embodiments, or the technical improvements to technologies on the market, or to enable other persons of ordinary skill in the art to understand the embodiments disclosed here.

The invention claimed is:

1. A method for performing a backup task to backup data, from a client terminal to a server over a network, comprising:

training a thread prediction model based on an execution record associated with a historical backup task, wherein the execution record comprises:

a first historical value of a historical number of threads for executing the historical backup task; and a second historical value of a storage resource utilization rate of the client terminal;

obtaining a first attribute value of a current storage resource utilization rate of the client terminal;

determining a number of threads to perform the backup task, wherein determining the number of threads comprises:

using the first attribute value and the thread prediction model to obtain the number of threads, wherein the thread prediction model characterizes an association between the number of threads and the first attribute value;

causing the client terminal to perform the backup task using the number of threads to back up the data.

2. The method according to claim 1, wherein the execution record further comprises:

a backup efficiency of the historical backup task.

3. The method according to claim 1, wherein the thread prediction model comprises a very fast decision tree (VFDT) model.

4. The method according to claim 1, wherein the execution record comprises a third historical value, wherein the third historical value comprises at least one of the following:

a number of processor cores of the client terminal, a processing resource utilization rate of the client terminal, an input/output resource utilization rate of the client terminal, a number of files to be backed up by the backup task on the client terminal, and a size of data to be backed up by the backup task on the client terminal.

5. The method according to claim 1, wherein the execution record comprises a third historical value, wherein the third historical value comprises at least one of the following:

a number of backup and recovery tasks being run on the server, a processing resource utilization rate of the server, a storage resource utilization rate of the server, and an input/output resource utilization rate of the server.

6. The method according to claim 1, wherein the execution record comprises a third historical value, wherein the third historical value comprises at least one of the following:

an available network bandwidth, and a network round-trip time.

7. The method according to claim 1, wherein the execution record comprises a third historical value, wherein the third historical value comprises:

a number of backup and recovery tasks being run on the server.

8. The method according to claim 7, wherein after obtaining the first attribute value, the method further comprises:

obtaining a second attribute value of a current number of backup and recovery tasks being run on the server.

9. The method according to claim 8, wherein determining the number of threads to perform the backup task, further comprises:

using the second attribute value and the thread prediction model to obtain the number of threads, wherein the thread prediction model characterizes a second association between the number of threads and the second attribute value.

10. An electronic device, comprising:

at least one memory; and at least one processing unit configured to perform a method for performing a backup task to backup data from a client terminal to a server over a network, the method comprising:

training a thread prediction model based on an execution record associated with a historical backup task, wherein the execution record comprises:

a first historical value of a historical number of threads for executing the historical backup task; and a second historical value of a storage resource utilization rate of the client terminal;

obtaining a first attribute value of a current storage resource utilization rate of the client terminal;

determining a number of threads to perform the backup task, wherein determining the number of threads comprises:

using the first attribute value and the thread prediction model to obtain the number of threads, wherein the thread prediction model characterizes an association between the number of threads and the first attribute value;

causing the client terminal to perform the backup task using the number of threads to back up the data.

11. The device according to claim 10, wherein the execution record further comprises:

a backup efficiency of the historical backup task.

12. The device according to claim 10, wherein the thread prediction model comprises a very fast decision tree (VFDT) model.

13. The device according to claim 10, wherein the execution record comprises a third historical value, wherein the third historical value comprises at least one of the following:

a number of processor cores of the client terminal, a processing resource utilization rate of the client terminal, an input/output resource utilization rate of the client terminal, a number of files to be backed up by the backup task on the client terminal, and a size of data to be backed up by the backup task on the client terminal.

14. The device according to claim 10, wherein the execution record comprises a third historical value, wherein the third historical value comprises at least one of the following:

a number of backup and recovery tasks being run on the server, a processing resource utilization rate of the server, a storage resource utilization rate of the server, and an input/output resource utilization rate of the server.

15. The device according to claim 10, wherein the execution record comprises a third historical value, wherein the third historical value comprises at least one of the following:

an available network bandwidth, and a network round-trip time.

16. A computer program product tangibly stored on a non-transitory computer-readable medium and comprising machine-executable instructions that, when executed, cause a machine to perform a method for performing a backup task to backup data from a client terminal to a server over a network, comprising:

training a thread prediction model based on an execution record associated with a historical backup task, wherein the execution record comprises:

a first historical value of a historical number of threads for executing the historical backup task; and a second historical value of a storage resource utilization rate of the client terminal;

obtaining a first attribute value of a current storage resource utilization rate of the client terminal;

determining a number of threads to perform the backup task, wherein determining the number of threads comprises:

using the first attribute value and the thread prediction model to obtain the number of threads, wherein the thread prediction model characterizes an association between the number of threads and the first attribute value;

causing the client terminal to perform the backup task using the number of threads to back up the data.

17. The computer program product according to claim 16, wherein the execution record further comprises:

a backup efficiency of the historical backup task.

18. The computer program product according to claim 16, wherein the execution record comprises a third historical value, wherein the third historical value comprises at least one of the following:

a number of processor cores of the client terminal, a processing resource utilization rate of the client terminal, an input/output resource utilization rate of the client terminal, a number of files to be backed up by the backup task on the client terminal, and a size of data to be backed up by the backup task on the client terminal.

19. The computer program product according to claim 16, wherein the execution record comprises a third historical value, wherein the third historical value comprises at least one of the following:

a number of backup and recovery tasks being run on the server, a processing resource utilization rate of the server, a storage resource utilization rate of the server, and an input/output resource utilization rate of the server.

20. The computer program product according to claim 16, wherein the execution record comprises a third historical value, wherein the third historical value comprises at least one of the following:

an available network bandwidth, and a network round-trip time.

* * * * *